US009252936B2

(12) United States Patent
Olsson et al.

(10) Patent No.: US 9,252,936 B2
(45) Date of Patent: Feb. 2, 2016

(54) GSM AND LTE MULTIPLEXING

(75) Inventors: Magnus Olsson, Stockholm (SE);
Göran Rune, Linköping (SE); Per Synnergren, Luleå (SE); Erik Westerberg, Enskede (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 596 days.

(21) Appl. No.: 12/943,801

(22) Filed: Nov. 10, 2010

(65) Prior Publication Data
US 2011/0149908 A1 Jun. 23, 2011

Related U.S. Application Data

(60) Provisional application No. 61/287,575, filed on Dec. 17, 2009, provisional application No. 61/287,623, filed on Dec. 17, 2009, provisional application No. 61/287,438, filed on Dec. 17, 2009, provisional application No. 61/287,627, filed on Dec. 17, 2009, provisional application No. 61/287,630, filed on Dec. 17, 2009, provisional application No. 61/287,954, filed on Dec. 18, 2009.

(51) Int. Cl.
*H04L 12/26* (2006.01)
*H04L 5/00* (2006.01)
*H04W 36/00* (2009.01)
(Continued)

(52) U.S. Cl.
CPC .......... *H04L 5/0055* (2013.01); *H04W 36/0022* (2013.01); *H04W 60/005* (2013.01); *H04W 72/02* (2013.01); *H04W 72/0446* (2013.01); *H04W 72/1215* (2013.01); *H04W 76/045* (2013.01); *H04W 88/02* (2013.01); *H04W 88/06* (2013.01); *H04W 88/08* (2013.01)

(58) Field of Classification Search
USPC ................................... 370/331, 252
See application file for complete search history.

(56) References Cited

U.S. PATENT DOCUMENTS

| 5,625,677 A | 4/1997 | Feiertag et al. |
| 6,122,270 A | 9/2000 | Whinnett et al. |

(Continued)

FOREIGN PATENT DOCUMENTS

| EA | 1740007 A1 | 1/2007 |
| EP | 2197236 A1 | 6/2010 |

(Continued)

OTHER PUBLICATIONS

3GPP TS 24.008, V10.1.0; 3rd Generation Partnership Project; Technical Specification Group Core Network and Terminals; Mobile Radio Interface Layer 3 Specification; Core Network Protocols; Stage 3 (Release 10); Dec. 2010.

(Continued)

*Primary Examiner* — Marcus R Smith
*Assistant Examiner* — Dewanda Samuel
(74) *Attorney, Agent, or Firm* — Withrow & Terranova, PLLC

(57) ABSTRACT

In a method of operating a wireless terminal, the wireless terminal (30) sends a request to participate in a circuit switched call with a circuit switched network. Prior to establishment of the circuit switched call the wireless terminal (30) releases or performs an inter-radio access technology handover of an existing packet switched session with an original packet switched network. The wireless terminal (30) then reconnects to the packet switched session to obtain a reconnected packet switched session. Thereafter the wireless terminal (30) interleaves packet switched transmissions of the reconnected packet switched session with voice transmissions of the circuit switched call.

22 Claims, 10 Drawing Sheets

(51) Int. Cl.
*H04W 60/00* (2009.01)
*H04W 72/12* (2009.01)
*H04W 72/02* (2009.01)
*H04W 72/04* (2009.01)
*H04W 76/04* (2009.01)
*H04W 88/06* (2009.01)
*H04W 88/02* (2009.01)
*H04W 88/08* (2009.01)

(56) References Cited

U.S. PATENT DOCUMENTS

| | | | |
|---|---|---|---|
| 6,463,054 B1 | 10/2002 | Mazur et al. | |
| 6,560,457 B1 | 5/2003 | Silver et al. | |
| 6,608,832 B2 | 8/2003 | Forslow | |
| 6,751,472 B1 | 6/2004 | Muhonen | |
| 6,904,058 B2 | 6/2005 | He et al. | |
| 7,171,216 B1 * | 1/2007 | Choksi | 455/456.1 |
| 7,463,901 B2 | 12/2008 | Svedberg et al. | |
| 8,045,985 B2 | 10/2011 | Ahn | |
| 8,107,433 B2 * | 1/2012 | Jokinen | 370/331 |
| 8,107,954 B2 * | 1/2012 | Islam et al. | 455/434 |
| 8,125,960 B2 | 2/2012 | Iwamura et al. | |
| 8,144,696 B2 * | 3/2012 | Kallio et al. | 370/352 |
| 8,219,085 B2 | 7/2012 | Mittal et al. | |
| 8,320,291 B2 * | 11/2012 | Rune et al. | 370/312 |
| 8,358,629 B2 | 1/2013 | Grilli et al. | |
| 8,537,748 B2 | 9/2013 | Witzel et al. | |
| 8,559,417 B2 | 10/2013 | Yun et al. | |
| 8,594,074 B2 | 11/2013 | Olsson et al. | |
| 8,976,757 B2 | 3/2015 | Bennett et al. | |
| 2003/0109256 A1 | 6/2003 | Holcman | |
| 2004/0043793 A1 | 3/2004 | Sakata | |
| 2004/0184439 A1 * | 9/2004 | Blanc et al. | 370/349 |
| 2005/0043046 A1 | 2/2005 | Lee | |
| 2006/0073831 A1 * | 4/2006 | Guyot et al. | 455/443 |
| 2006/0073841 A1 * | 4/2006 | Narasimha et al. | 455/458 |
| 2007/0207824 A1 | 9/2007 | Bhattacharjee et al. | |
| 2008/0037515 A1 * | 2/2008 | Sander | 370/352 |
| 2008/0194264 A1 * | 8/2008 | Eckert et al. | 455/445 |
| 2008/0214190 A1 | 9/2008 | Aalto | |
| 2008/0298353 A1 * | 12/2008 | Zhu et al. | 370/356 |
| 2009/0010247 A1 * | 1/2009 | Stille | 370/352 |
| 2009/0036131 A1 | 2/2009 | Diachina et al. | |
| 2009/0086674 A1 * | 4/2009 | Ejzak | 370/331 |
| 2009/0201835 A1 | 8/2009 | Balakrishnan et al. | |
| 2009/0238143 A1 * | 9/2009 | Mukherjee et al. | 370/331 |
| 2009/0276532 A1 * | 11/2009 | Bishop | 709/228 |
| 2009/0285157 A1 | 11/2009 | Yeoum et al. | |
| 2010/0080171 A1 | 4/2010 | Rune et al. | |
| 2010/0085962 A1 | 4/2010 | Issaeva et al. | |
| 2010/0113010 A1 * | 5/2010 | Tenny et al. | 455/423 |
| 2010/0135200 A1 * | 6/2010 | Karaoguz et al. | 370/328 |
| 2010/0172329 A1 | 7/2010 | Yokoyama et al. | |
| 2010/0173667 A1 | 7/2010 | Hui et al. | |
| 2010/0177669 A1 | 7/2010 | Suo et al. | |
| 2010/0202413 A1 | 8/2010 | Vikberg et al. | |
| 2010/0234026 A1 | 9/2010 | Tenny et al. | |
| 2011/0110326 A1 * | 5/2011 | Rexhepi et al. | 370/331 |
| 2011/0122864 A1 | 5/2011 | Cherifi et al. | |
| 2011/0134882 A1 | 6/2011 | Aoyama et al. | |
| 2011/0149852 A1 | 6/2011 | Olsson et al. | |
| 2011/0149853 A1 | 6/2011 | Olsson et al. | |
| 2011/0149907 A1 | 6/2011 | Olsson et al. | |
| 2011/0149908 A1 | 6/2011 | Olsson et al. | |
| 2011/0149925 A1 | 6/2011 | Olsson et al. | |
| 2011/0151874 A1 | 6/2011 | Olsson et al. | |
| 2012/0113900 A1 | 5/2012 | Shaheen | |
| 2013/0017805 A1 | 1/2013 | Jonsson et al. | |

FOREIGN PATENT DOCUMENTS

| | | | |
|---|---|---|---|
| WO | 0101720 A1 | 1/2001 | |
| WO | WO 0182637 A1 * | 11/2001 | H04Q 7/22 |
| WO | 2004057894 A1 | 7/2004 | |
| WO | 2008087518 A2 | 7/2008 | |
| WO | 2008088243 A1 | 7/2008 | |
| WO | 2008088245 A1 | 7/2008 | |
| WO | 2008088258 A1 | 7/2008 | |
| WO | WO 2008088245 A1 * | 7/2008 | H04Q 7/38 |
| WO | 2008/148432 A1 | 12/2008 | |
| WO | 2009000696 A1 | 12/2008 | |
| WO | 2009044458 A1 | 4/2009 | |
| WO | 2009/087099 A1 | 7/2009 | |
| WO | 2009/084146 A1 | 9/2009 | |
| WO | 2010146468 A2 | 12/2010 | |
| WO | 2011073847 A2 | 6/2011 | |
| WO | 2011073847 A3 | 6/2011 | |
| WO | 2011073849 A1 | 6/2011 | |
| WO | 2011073884 A1 | 6/2011 | |
| WO | 2011073910 A1 | 6/2011 | |
| WO | 2011073913 A1 | 6/2011 | |
| WO | 2011073946 A1 | 6/2011 | |

OTHER PUBLICATIONS

International Search Report and Written Opinion mailed Apr. 26, 2011 in PCT application PCT/IB2010/055609.
3GPP TS 36.331 V8.9.0; Technical Specification Group Radio Access Network; Evolved Universal Terrestrial Radio Access (E-UTRA); Radio Resource Control (RRC); Protocol Specification (Release 8) (Mar. 2010).
International Search Report and Written Opinion mailed May 18, 2011 in PCT application PCT/IB2010/055816.
International Search Report and Written Opinion mailed May 17, 2011 in PCT application PCT/IB2010/055820.
International Search Report and Written Opinion mailed May 18, 2011 in PCT application PCT/IB2010/055888.
International Search Report and Written Opinion mailed Jun. 15, 2011 in PCT application PCT/IB2010/055601.
International Search Report and Written Opinion mailed May 13, 2011 in PCT application PCT/IB2010/055778.
3GPP TS 36.331 V10.1.0 3rd Generation Partnership Project; Evolved Universal Terrestrial Radio Access (E-UTRA); Radio Resource Control (RRC); Protocol Specification (Release 10) (Mar. 2011).
3GPP TS 23.272 V10.3.1, 3rd Generation Partnership Project; Technical Specification Group Services and System Aspects; Circuit Switched (CS) fallback in Evolved Packet System (EPS); Stage 2 (Release 10) (Apr. 2011).
General Packet Radio Service (GPRS) enhancements for Evolved Universal Terrestrial Radio Access Network (E-UTRAN) access, 3GPP Technical Specification, Mar. 2011, V10.3.0.
3GPP TS 25.331 V10.3.1, 3rd Generation Partnership Project; Technical Specification Group Radio Access Network; Radio Resource Control (RRC); Protocol Specification (Release 10) (Apr. 2011).
3GPP TS 23.272 V8.4.0, Digital Cellular Telecommunications System (Phase 2+); Universal Mobile Telecommunications System (UMTS); LTE; Circuit Switched (CS) Fallback in Evolved Packet System (EPS); Stage 2 (Release 8) Jun. 1, 2009.
U.S. Appl. No. 13/180,195, filed Jul. 11, 2011, entitled "Method and Apparatus for Transferring Telecommunications Connections".
Office Action mailed Dec. 11, 2012 in U.S. Appl. No. 12/943,770.
Office Action mailed Dec. 20, 2012 in U.S. Appl. No. 12/943,504.
Office Action mailed Nov. 19, 2012 in U.S. Appl. No. 12/943,612.
Office Action mailed Oct. 5, 2012 in U.S. Appl. No. 12/943,736.
Office Action mailed May 31, 2013 in U.S. Appl. No. 12/943,612.
Notice of Allowance mailed May 15, 2013 in U.S. Appl. No. 12/943,736.
Notice of Allowance mailed Jan. 9, 2014 in U.S. Appl. No. 12/943,504.
Non-final Office Action for U.S. Appl. No. 12/943,612 mailed Apr. 10, 2014, 13 pages.
3GPP TS 23.272, "3rd Generation Partnership Project; Technical Specification Group Services and System Aspects; Circuit Switched (CS) fallback in Evolved Packet System (EPS); Stage 2 (Release 10)," V10.4.0, 3GPP Organizational Partners, Jun. 2011, 78 pages.

(56) References Cited

OTHER PUBLICATIONS

3GPP TS 23.401, "3rd Generation Partnership Project; Technical Specification Group Services and System Aspects; General Packet Radio Service (GPRS) enhancements for Evolved Universal Terrestrial Radio Access Network (E-UTRAN) access (Release 10)," V10.4.0, 3GPP Organizational Partners, Jun. 2011, 281 pages.
3GPP TS 23.401, "3rd Generation Partnership Project; Technical Specification Group Services and System Aspects; General Packet Radio Service (GPRS) enhancements for Evolved Universal Terrestrial Radio Access Network (E-UTRAN) access (Release 10)," V10.3.0, 3GPP Organizational Partners, Mar. 2011, 278 pages.
3GPP TS 25.331, "3rd Generation Partnership Project; Technical Specification Group Radio Access Network; Radio Resource Control (RRC); Protocol specification (Release 10)," V10.4.0, 3GPP Organizational Partners, Jun. 2011, 1879 pages.
3GPP TS 25.331, "3rd Generation Partnership Project; Technical Specification Group Radio Access Network; Radio Resource Control (RRC); Protocol specification (Release 10)," V10.1.0, 3GPP Organizational Partners, Sep. 2010, 1806 pages.
3GPP TS 25.413, "3rd Generation Partnership Project; Technical Specification Group Radio Access Network; UTRAN Iu interface Radio Access Network Application Part (RANAP) signalling (Release 10)," V10.0.0, 3GPP Organizational Partners, Dec. 2010, 409 pages.
3GPP TS 25.413, "3rd Generation Partnership Project; Technical Specification Group Radio Access Network; UTRAN Iu interface Radio Access Network Application Part (RANAP) signalling (Release 10)," V10.2.0, 3GPP Organizational Partners, Jun. 2011, 425 pages.
Author Unknown, "UTRA Cell_DCH mobility to UTRA and EUTRA CSG cells," 3GPP TSG-RAN WG2 Meeting #66bis, R2-093836, Nokia Siemens Networks, Nokia Corporation, Los Angeles, USA, Jun. 4-Jul. 3, 2009, 7 pages.
Author Unknown, "Correction of CSFB," 3GPP TSG-RAN WG3 #67, R3-101145, Alcatel-Lucent, NTT Docomo, San Francisco, USA, Feb. 22-26, 2010, 3 pages.
Author Unknown, "On the alternative selection for Single Radio VCC from LTE," 3GPP TSG SA WG2 Architecture—S2#57, S2-071929, Nokia Siemens Networks, Nokia, Beijing, China, Apr. 23-27, 2007, 5 pages.
Author Unknown, "Details on the RRC Connection Release procedure," 3GPP TSG-RAN WG2 #61, Tdoc R2-080930, Ericsson, Sorrento, Italy, Feb. 11-15, 2008, 9 pages.
Written Opinion for International Patent Application PCT/SE2011/051076 mailed Aug. 16, 2013, 12 pages.
Notice of Allowance for U.S. Appl. No. 12/943,736 mailed Aug. 22, 2013, 18 pages.
Final Office Action for U.S. Appl. No. 12/943,685 mailed Nov. 8, 2013, 16 pages.
Advisory Action for U.S. Appl. No. 12/943,685 mailed Feb. 13, 2014, 7 pages.
Final Office Action for U.S. Appl. No. 13/180,195 mailed Mar. 6, 2014, 17 pages.
Notice of Allowance for U.S. Appl. No. 12/943,504 mailed Jul. 15, 2014, 5 pages.
Non-Final Office Action for U.S. Appl. No. 12/943,685 mailed Sep. 12, 2014, 16 pages.
Final Office Action for U.S. Appl. No. 12/943,612 mailed Nov. 5, 2014, 15 pages.
Office Action mailed Nov. 12, 2013 in U.S. Appl. No. 13/180,195.
Advisory Action for U.S. Appl. No. 12/943,612, mailed Mar. 20, 2015, 3 pages.
Non-Final Office Action for U.S. Appl. No. 12/943,612, mailed Jun. 30, 2015, 11 pages.
Non-Final Office Action for U.S. Appl. No. 12/943,685, mailed Mar. 27, 2015, 18 pages.
Non-Final Office Action for U.S. Appl. No. 13/180,195, mailed Jan. 16, 2015, 19 pages.
Notice of Allowance and Examiner-Initiated Interview Summary for U.S. Appl. No. 12/943,685, mailed Sep. 23, 2015, 14 pages.
U.S. Office Action mailed Mar. 6, 2013 in U.S. Appl. No. 12/943,685.

\* cited by examiner

Fully UE centric solution

Network assisted solution

WIRELESS TERMINAL MAINTAINS PACKET SWITCHED SESSION WITH LTE NETWORK UPON ESTABLISHMENT OF CIRCUIT SWITCHED CALL

GSM AND LTE MULTIPLEXING

RELATED APPLICATIONS

This application is related to the following United States Provisional Patent Applications, all of which are incorporated herein by reference in their entireties:

U.S. Provisional Patent Application 61/287,575 to Magnus Olsson et al., entitled "GSM and LTE Multiplexing Systems", filed on Dec. 17, 2009.

U.S. Provisional Patent Application 61/287,623 to Magnus Olsson et al., entitled "Measurement Report Relay in Access Division Multiplexing Systems", filed on Dec. 17, 2009.

U.S. Provisional Patent Application 61/287,438 to Magnus Olsson et al., entitled "WCDMA and LTE Multiplexing", filed on Dec. 17, 2009.

U.S. Provisional Patent Application 61/287,627 to Magnus Olsson et al., entitled "Telecommunications Multiplexing", filed on Dec. 17, 2009.

U.S. Provisional Patent Application 61/287,630 to Magnus Olsson et al., entitled "Access Division Multiplexing—Call Setup Performance Improvement", filed on Dec. 17, 2009.

U.S. Provisional Patent Application 61/287,954 to Magnus Olsson et al., entitled "Scheduled Optimized for GSM and LTD Multiplexing", filed on Dec. 17, 2009.

This application is related to the following United States Patent Applications, all of which are filed on same date herewith and incorporated herein by reference in their entireties:

U.S. patent application Ser. No. 12/943,770 to Magnus Olsson et al., entitled "Link Report Relay in Access Division Multiplexing Systems".

U.S. patent application Ser. No. 12/943,612 to Magnus Olsson et al., entitled "Keeping Packet Switched Session in LTE While Circuit Switched Registered in WCDMA".

U.S. patent application Ser. No. 12/943,685 to Magnus Olsson et al., entitled "Maintaining Packet Switched Session in LTE When Establishing GSM Circuit Switched Call".

U.S. patent application Ser. No. 12/943,736 to Magnus Olsson et al., entitled "Call Setup For Access Division Multiplexing".

U.S. patent application Ser. No. 12/943,504 to Magnus Olsson et al., entitled "Scheduling For Access Division Multiplexing".

BACKGROUND

This technology pertains to wireless communications networks.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Universal Terrestrial Radio Access Network (E-UTRAN) are ongoing within the $3^{rd}$ Generation Partnership Project (3GPP). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Serving Gateways, or SGWs) rather than to radio network controller (RNC) nodes. In general, in LTE the functions of a radio network controller (RNC) node are distributed between the radio base stations nodes (eNodeB's in LTE) and SGWs. As such, the radio access network (RAN) of an LTE system has an essentially "flat" architecture comprising radio base station nodes without reporting to radio network controller (RNC) nodes.

Cellular Circuit-Switched (CS) telephony was introduced in the first generation of mobile networks. Since then CS telephony has become the largest service in the world with approximately 4 billion subscriptions sold. Even today, the main part of the mobile operator's revenue comes from the CS telephony service (including Short Message Services (SMS)), and the 2G GSM networks still dominate the world in terms of subscriptions. 3G subscriptions are increasing in volume, but that increase is less in part because of users with handheld mobile terminals migrating from 2G to 3G and more as a result of mobile broadband implemented via dongles or embedded chipsets in laptops.

The long-term evolution (LTE) project within 3GPP aims to further improve the 3G standard to, among other things, provide even better mobile broadband to the end-users (higher throughput, lower round-trip-times, etc.).

A common view in the telecommunication industry is that the future networks will be all-IP networks. Based on this assumption, the CS domain in was removed in the LTE work. As a result, the telephony service cannot be used by a 3GPP Release 8 compliant LTE terminal, unless one of the following four things is done:

(1) Implement circuit switched (CS) fallback (CSFB), so that an LTE terminal falls back to 2G GSM when telephony service is used.

(2) Implement 3GPP IP Multimedia Subsystem (IMS)/Multimedia Telephony (MMTel), which is a simulated CS telephony service provided over IP and IMS that inter-works with the Public Switched Telephone Network (PSTN)/Public Land Mobile Network (PLMN).

(3) Implement a tunneling solution with Unlicensed Mobile Access (UMA)/Generic Access Network (GAN) over LTE where the CS service is encapsulated into an IP tunnel.

(4) Implement a proprietary Voice over IP (VoIP) solution with PSTN/PLMN interworking.

All of these four possibilities have drawbacks. In deployed GSM networks that do not have Dual Transfer Mode (DTM)

capabilities; CS and Packet Switched (PS) services cannot be used in parallel. Hence, all PS services running prior to a call to or from a terminal using Circuit Switched Fallback (CSFB) are put on hold or are terminated. If the GSM network has DTM, the PS performance will be greatly reduced (from 10's of Mbps to 10's to 100's of kbps). One drawback with the CS fallback approach is that when calling or being called and the terminal is falling back to GSM and the CS service from LTE. Circuit Switched Fallback (CSFB) also prolongs call set-up time.

The IMS/MMTel approach uses a completely new core/service layer that is IMS based. This provides new possibilities to enhance the service but also comes with the drawback of a financial hurdle for the operator to overcome. A new core network drives capital expenditures (CAPEX), and integration of that core network drives an initial operating expenditures (OPEX) increase. Further, the IMS/MMTel approach needs features implemented in the terminals and the legacy CS network in order to handle voice handover to/from the 2G/3G CS telephony service.

Using UMA/GAN over LTE is not a standardized solution so a drawback is that it is a proprietary solution which may make terminal availability a problem. It also adds additional functions to the core/service layer in both the network and terminal, e.g., a GAN controller in the network and GAN protocols in the UE terminal.

The proprietary VoIP approach, if operator controlled, comes with the same drawbacks as for the IMS/MMTel (new core/service layer) approach along with the difficulties associated with it being proprietary and handover to 2G/3G CS may not be supported.

There is yet a further solution for using a legacy CS telephony service with a wireless terminal such as a 3GPP release 8-compliant LTE terminal. In that further solution, also known as a type of Access Division Multiplexing (ADM), transmissions of GSM CS voice are interleaved in between LTE transmissions. See, e.g., PCT/SE2007/000358, which is incorporated herein by reference. In one example implementation of such an ADM solution a wireless terminal simultaneously communicates with two TDMA-based radio systems, e.g., the wireless terminal can maintain communications paths to both systems by means of alternating in time its communication between the two systems. The toggling between the two systems is on a time scale small enough to effectively yield a simultaneous communication between the two systems.

The ADM solution attempts to achieve a good PS connection in parallel with the telephony service when in LTE coverage but still reusing the legacy CS core and deployed GSM network for the telephony service to reduce costs but still maintain good coverage for the telephony service.

The ADM solution may be implemented in several ways. A first example implementation, illustrated in FIG. 1A, is a fully UE-centric solution where no coordination is needed between the GSM CS core and a LTE PS core. A second example implementation, illustrated by FIG. 1B, is a network assisted solution which can either be based on circuit switched fallback (CSFB), or a solution that only reuses paging over LTE.

From a radio perspective, the ADM solution can be realized in any of three different ways: As a first example radio realized embodiment illustrated in FIG. 2A, the LTE transmissions could be multiplexed with the GSM transmissions on a GSM TDMA frame level. In FIG. 2A, frames for GSM transmissions and frames of LTE transmissions have different darkness shading. This first example solution requires that the GSM circuit switched (CS) telephony service only use the half rate codec. When GSM is running at half rate, then every second GSM TDMA frame is not used by the user.

As a second example radio-realized embodiment illustrated in FIG. 2B, the LTE transmissions could be multiplexed with the GSM transmissions on GSM burst level. GSM transmits speech using bursts, each with a duration of 0.577 ms. In speech operation, after having sent one burst, the Rx/Tx part sleeps for 7*0.577 ms until it wakes up again and do a new Rx/Tx process. In this second example this time gap could be used for LTE transmissions.

As a third example radio-realized embodiment illustrated in FIG. 2C, any of above can be used for transmission but by using dual receiver for simultaneous reception of GSM and LTE in the downlink for simplified operation.

The architecture and principles of the circuit switched fallback (CSFB) are defined in, e.g., 3GPP TS 23.272, Circuit Switched Fallback in Evolved Packet System, Stage 2 (Release 8), which is abbreviated herein as "23.272" and which is incorporated herein by reference in its entirety.

SUMMARY

In one of its aspects the technology disclosed herein concerns a method of operating a wireless terminal. In accordance with general acts of the method, the wireless terminal sends a request to participate in a circuit switched call with a circuit switched network. Prior to establishment of the circuit switched call the wireless terminal releases or performs an inter-radio access technology handover of an existing packet switched session with an original packet switched network. The circuit switched call is established with the circuit switched network. The wireless terminal then reconnects to the packet switched session to obtain a reconnected packet switched session. Thereafter the wireless terminal interleaves packet switched transmissions of the reconnected packet switched session with voice transmissions of the circuit switched call.

In an example embodiment and mode the act of the wireless terminal sending a request to participate in a circuit switched call comprises the wireless terminal sending an extended service request message to an evolved packet core network and indicating that the wireless terminal is to perform a circuit switched fall back operation.

In an example embodiment and mode the act of the reconnecting to the packet switched session further comprises the wireless terminal sending a tracking area update message to a Long Term Evolution (LTE) radio access network after the circuit switched call is established.

In an example embodiment and mode the wireless terminal foregoes performing a routing update procedure.

An example embodiment and mode further comprises the wireless terminal sending a scheduling map to the Long Term Evolution (LTE) radio access technology network to indicate time transmission intervals (TTIs) that can be used for packet switched transmissions.

An example embodiment and mode further comprises configuring a feature group bit of the wireless terminal to prevent an inter-radio access technology packet switched handover.

In an example embodiment and mode the wireless performing the inter-radio access technology handover comprises handing over the existing packet switched session from the original packet switched network to a wideband code division multiple access network.

In an example embodiment and mode performing the inter-radio access technology handover comprises handing over the existing packet switched session from the original packet switched network to a GSM network to obtain a GSM dual transmission mode packet switched session; and further comprises the wireless terminal suspending the GSM dual transmission mode packet switched session and then sending a tracking area update message to a Long Term Evolution (LTE) radio access network for reconnecting to the packet switched session.

In one of its aspects the technology disclosed herein concerns a wireless terminal capable of communicating in multiple access division over a radio interface. The wireless terminal is configured to send a request to participate in a circuit switched call with a circuit switched network; release or perform an inter-radio access technology handover of an existing packet switched session with an original packet switched network prior to establishment of a circuit switched call; established the circuit switched call with the circuit switched network; and reconnect to the packet switched session to obtain a reconnected packet switched session. The wireless terminal thus includes a packet switched reconnection unit or packet switched reconnection logic. The wireless terminal is further configured to interleave packet switched transmissions of the reconnected packet switched session with voice transmissions of the circuit switched call.

In an example embodiment the wireless terminal further comprises a circuit switched call controller; a packet switched session controller; and a communications interface. The circuit switched call controller is configured to generate a request to participate in a circuit switched call with a circuit switched network and thereafter control the transmissions of the circuit switched call. The packet switched session controller is configured, prior to establishment of the circuit switched call, to release or perform an inter-radio access technology handover of an existing packet switched session with the original packet switched network, and thereafter to reconnect to the packet switched session to obtain the reconnected packet switched session. The packet switched session controller is also configured to control transmissions of the packet switched session. The communications interface is configured to perform, e.g., transmissions of the circuit switched call and transmissions of the packet switched session.

In an example embodiment the circuit switched controller is configured to send an extended service request message to an evolved packet core network and to indicate that the wireless terminal is to perform a circuit switched fall back operation.

In an example embodiment the packet switched session controller is configured to send a tracking area update message to a Long Term Evolution (LTE) radio access network after the circuit switched call is established for reconnecting to the packet switched session.

In an example embodiment the circuit switched call controller is configured to forego performing a routing update procedure before the circuit switched call is established.

In an example embodiment the packet switched session controller is configured to send a scheduling map to the Long Term Evolution (LTE) radio access technology network to indicate time transmission intervals (TTIs) that can be used for packet switched transmissions.

In an example embodiment the wireless terminal further comprises a feature group memory comprising a feature group bit which is configured to prevent an inter-radio access technology packet switched handover.

In an example embodiment the packet switched session controller is configured to perform a hand over of the existing packet switched session from the original packet switched network to a wideband code divisional multiple access network.

In an example embodiment the packet switched session controller is configured to performing a handover of the existing packet switched session from the original packet switched network to a GSM network to obtain a GSM dual transmission mode packet switched session; and is further configured to suspend the GSM dual transmission mode packet switched session and then to send a tracking area update message to a Long Term Evolution (LTE) radio access network for reconnecting to the packet switched session In another of its aspects the technology disclosed herein concerns a method of operating a communications system. The method comprises providing a packet switched session between a wireless terminal and an original packet switched network. The wireless terminal sends a request to participate in a circuit switched call with a circuit switched network. Prior to establishment of the circuit switched call, the wireless terminal releases or performs an inter-radio access technology handover of an existing packet switched session with an original packet switched network. Thereafter a circuit switched call is established between the wireless terminal and a circuit switched network. The wireless terminal then reconnects to the packet switched session to obtain a reconnected packet switched session. Thereafter the wireless terminal interleaves packet switched transmissions of the reconnected packet switched session with voice transmissions of the circuit switched call.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2B showing an embodiment comprising a single receiver/transmitter with multiplexing on a burst period level; and FIG. 2C showing an embodiment comprising a dual receiver/single transmitter.

DESCRIPTION

Figure 1A:
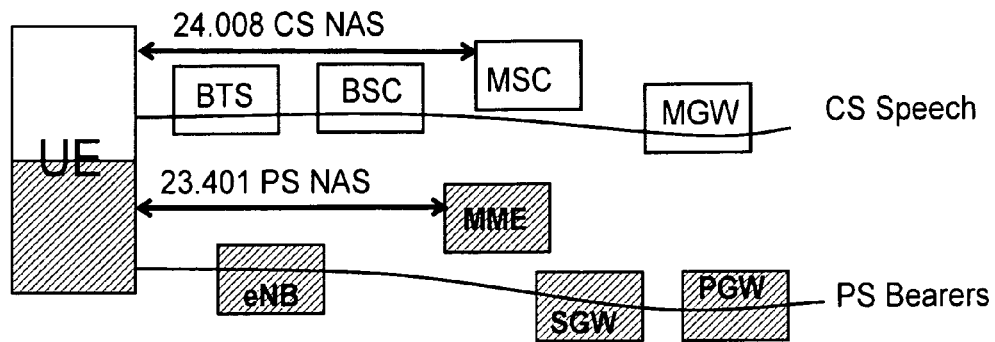
FIG. 1A is a diagrammatic view illustrating a fully UE centric solution ADM solution where no coordination is needed between a GSM CS core and a LTE PS core.
Figure 1B:
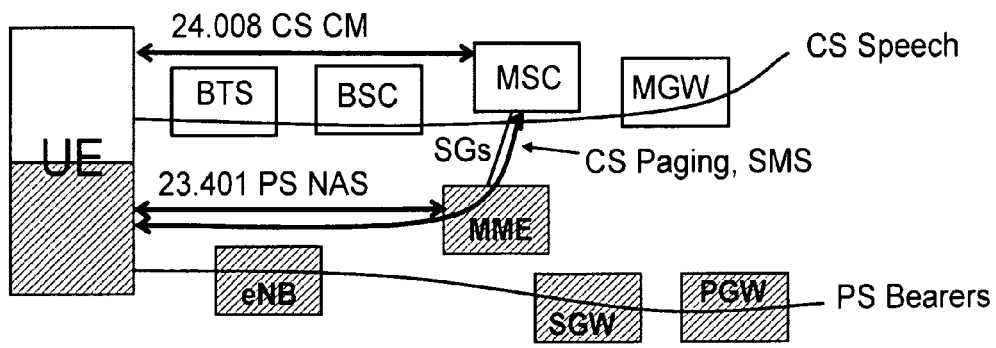
FIG. 1B is a diagrammatic view illustrating a network assisted ADM solution which can either be based on CS fallback (CSFB), or a solution that only reuses paging over LTE.
Figure 2A:
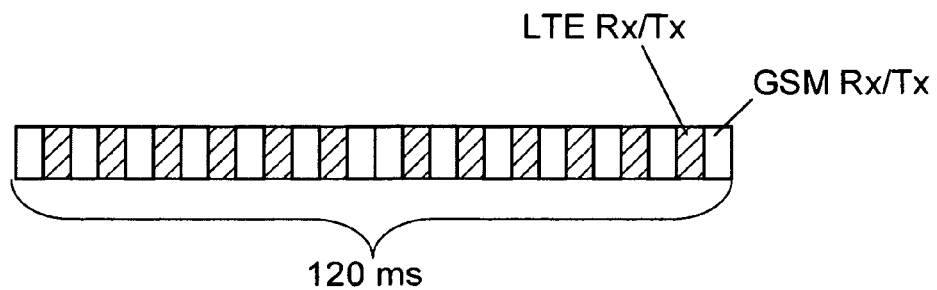
FIG. 2A, FIG. 2B, and FIG. 2C are differing example radio-realized embodiments illustrated of ADM solutions, with FIG. 2A showing an embodiment comprising a single receiver/transmitter with GSM at half rate and multiplexing on a TDMA frame level.
Figure 2B:
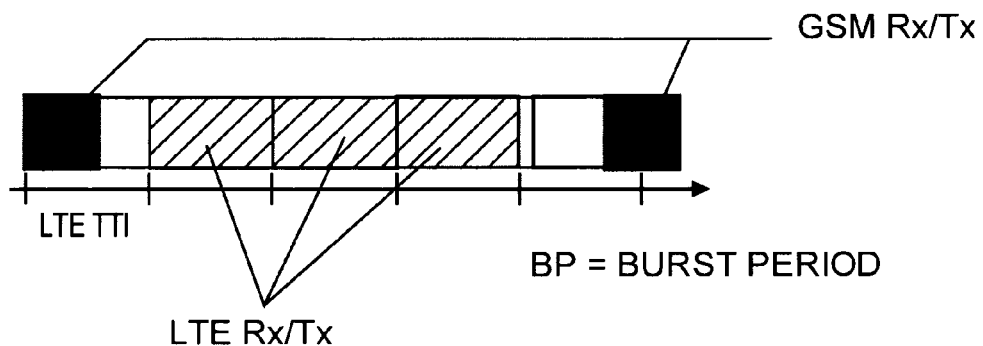
Figure 2C:
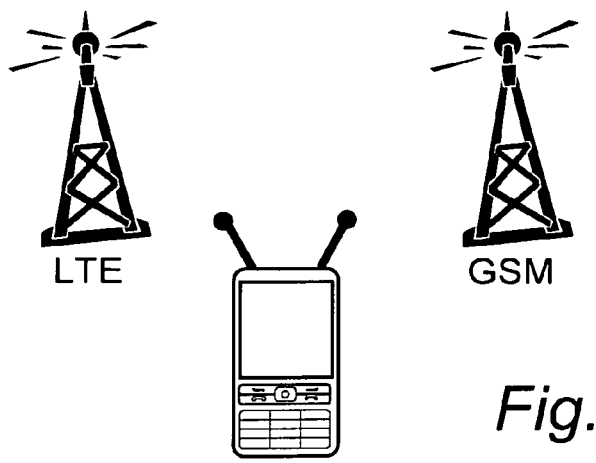

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 3:
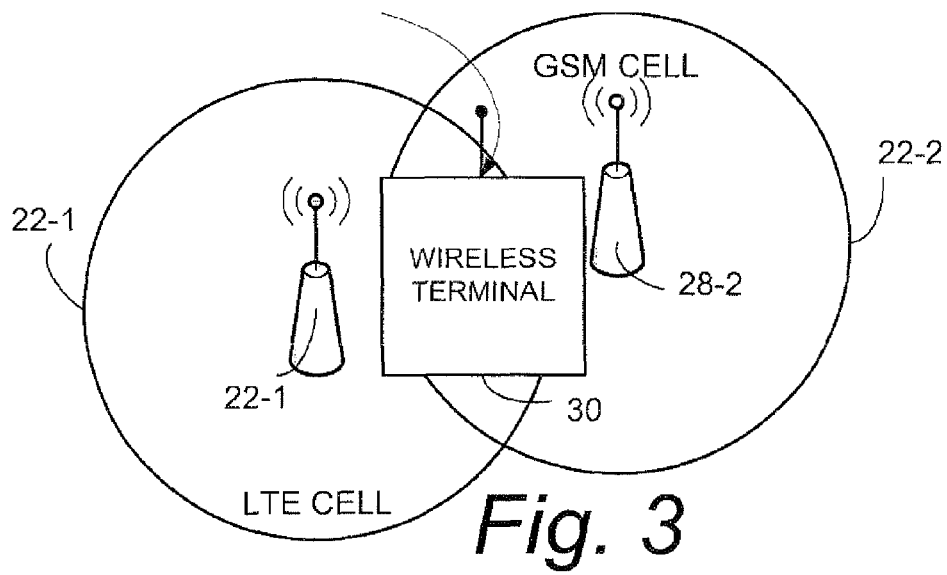
FIG. 3 is a diagrammatic view depicting a wireless terminal participating in access division multiplexing (ADM) with a LTE network and a GSM network.

The technology disclosed herein provides embodiments and modes wherein the circuit switched fallback (CSFB) solution is improved to enable multiplexing of circuit switched (CS) voice in Global System for Mobile communication (GSM) with a packet switched (PS) session in Long Term Evolution (LTE). FIG. 3 illustrates an example context and for one aspect of the technology disclosed herein wherein user equipment unit (UE) or wireless terminal 30 can participate in access division multiplexing (ADM) with two radio access technology networks in parallel. FIG. 3 shows a cell of Long Term Evolution (LTE) network 22-1 and a cell of Global System for Mobile communication (GSM) network 22-2 (a 2G network). The LTE network 22-1 comprises a base station or eNodeB 28-1 while the 2G network 22-2 comprises base station 28-2. As mentioned above, the LTE network 22-1 does not provide circuit switched (CS) services, so that a wireless terminal 30 participating in packet switched (PS) services offered by LTE network 22-1 must turn to another network, e.g., GSM network 22-2 for circuit switched (CS) services.

The technology disclosed herein assumes the system is using the network assisted solution such as that based on the 3GPP Release 8 CSFB and as generally described in PCT/SE2007/000358. The problem the technology here solves is that in 3GPP Release 8 CSFB, the LTE PS session is released when falling back to GSM (unless DTM is deployed in the network). Instead of releasing the LTE PS session when falling back to GSM resulting in no PS session or using DTM with low bit rates, the technology disclosed herein re-establishes and uses the LTE PS session during the duration of the GSM call. This means that the wireless terminal, using a wireless terminal-centric approach, has the responsibility to reconnect to the LTE PS session if it is capable of doing time division multiplexing between GSM and LTE. The technology disclosed herein thus optimizes the 3GPP Release 8 CSFB approach.

Figure 4:
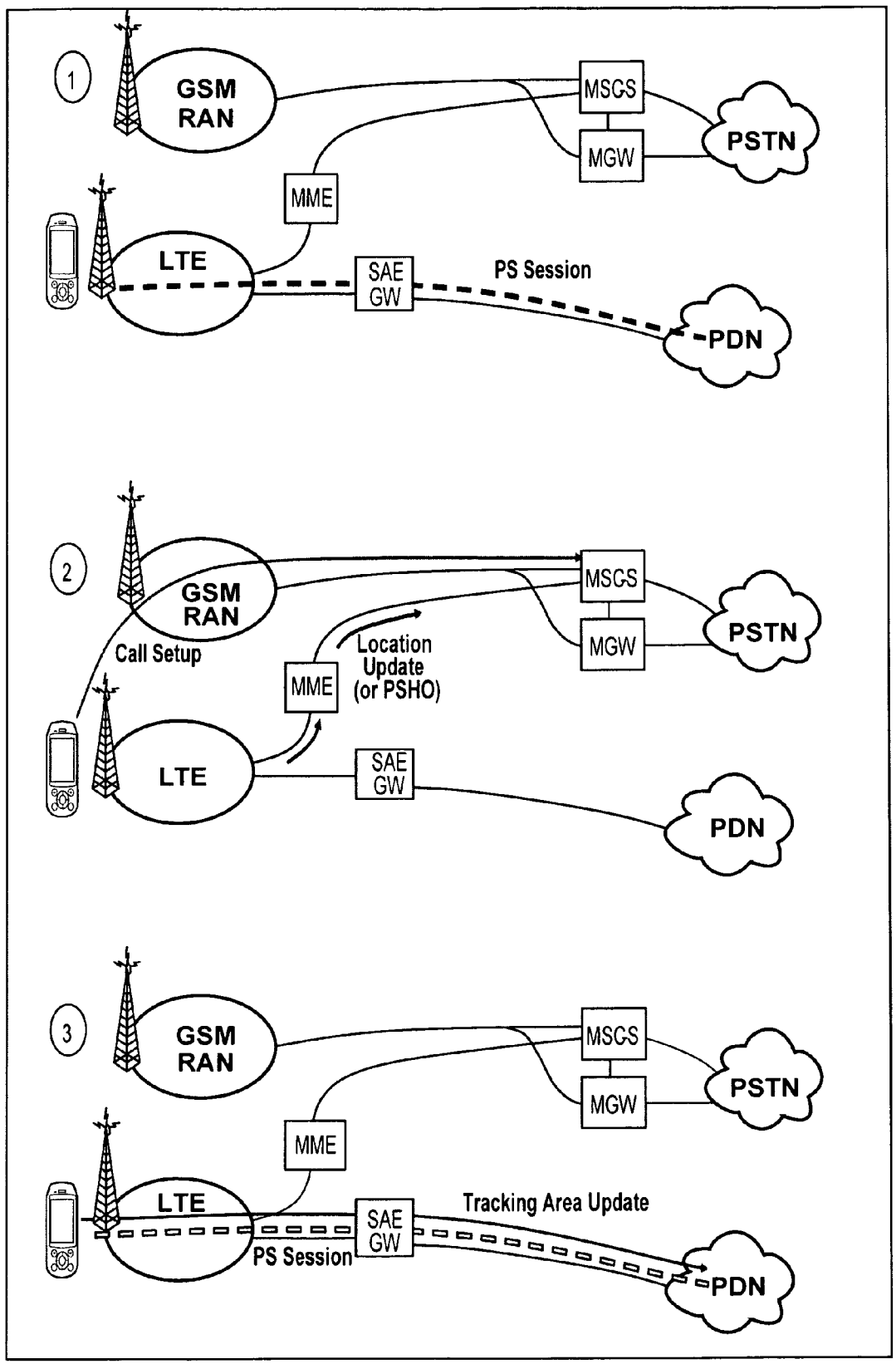
FIG. 4 is a diagrammatic view of aspects of the technology disclosed herein when originating a circuit switched call from a wireless terminal.

FIG. 4 illustrates aspects of the technology disclosed herein when originating a circuit switched call from wireless terminal 30. The example of FIG. 4 shows the case when a wireless terminal in a LTE PS session is originating a GSM call.

In step 1) of FIG. 4 the wireless terminal has an existing LTE PS session. In step 2) of FIG. 4 the wireless terminal originates a voice call, and the system either performs an inter-radio access technology packet switched (PS) handover (HO) of the PS session to GSM, or (if the system does not support IRAT PS HO) the LTE PS session is released. The wireless terminal performs a location area update (LAU) and establishes the voice call. In step 3) of FIG. 4 the wireless terminal performs a tracking area update (TAU) to resume LTE PS access. If IRAT PS HO was supported, then the TAU moves back the PS session to LTE. If the PS session was released, then the TAU reconnects the LTE PS session.

Figure 5:
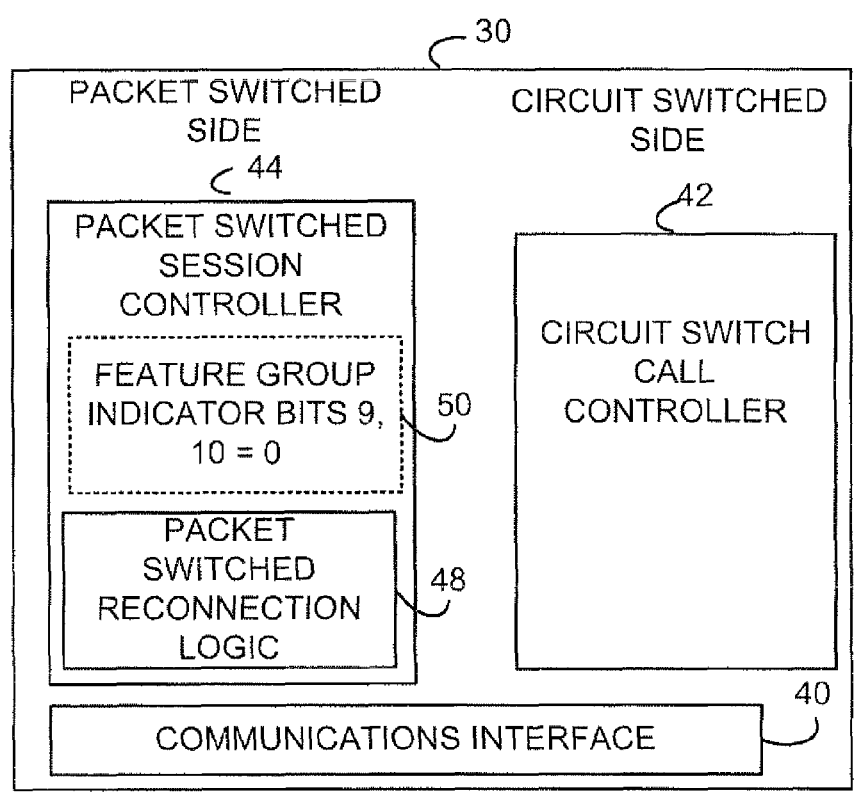
FIG. 5 is a schematic view of an example embodiment of a wireless terminal capable of access division multiplexing (ADM).

FIG. 5 shows an example, generic, and basic embodiment of wireless terminal 30. As shown in FIG. 5, wireless terminal 30 comprises communication interface 40; circuit switched call controller 42; and packet switched session controller 44. The circuit switched call controller 42 is configured to establish the circuit switched call and to govern the transmissions of the circuit switched call. The packet switched session controller 44 is configured to establish and maintain the packet switched session including the transmissions of the packet switched session. To this end the packet switched session controller 44 includes, e.g., packet switched reconnection logic 48. The communications interface 40 is configured to perform transmissions over a radio interface including the transmissions of the circuit switched call and the transmissions of the packet switched session.

Figure 6:
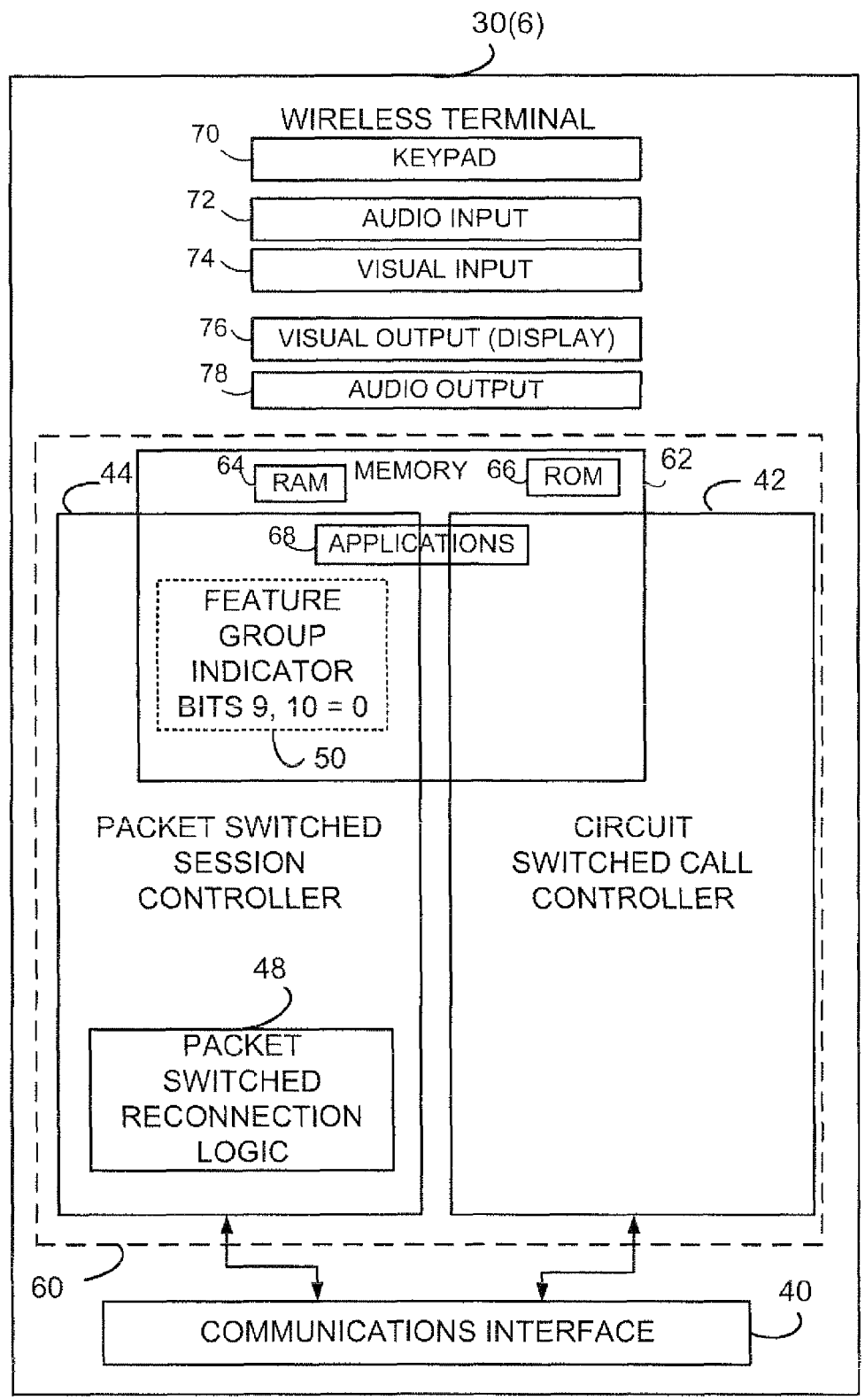
FIG. 6 is a more detailed schematic view of an example embodiment of a wireless terminal showing a platform implementation

FIG. 6 shows a more detailed example embodiment of wireless terminal 30(6) wherein certain functionalities can be realized by and/or provided on a platform 60. The terminology "platform" is a way of describing how the functional units of a communications unit or node can be implemented or realized by machine. One example platform is a computer implementation wherein one or more of the elements framed by line 60, including but not limited to circuit switched call controller 42 and packet switched session controller 44 (and its packet switched reconnection logic 48).

In one example implementation, the functionalities shown as framed by platform 60 and even other functionalities can be realized by one or more processors which execute coded instructions stored in memory (e.g., non-transitory signals) in order to perform the various acts described herein. In such a computer implementation the wireless terminal can comprise, in addition to a processor(s), a memory section 62 (which in turn can comprise random access memory 64; read only memory 66; application memory 68 (which stores, e.g., coded instructions which can be executed by the processor to perform acts described herein); and any other memory (such as cache memory, for example).

Whether or not specifically illustrated, typically the wireless terminal of each of the embodiments discussed herein can also comprise certain input/output units or functionalities, the representative input/output units for wireless terminal being illustrated in FIG. 12 as keypad 70; audio input device (e.g. microphone) 72; visual input device (e.g., camera) 74; visual output device (e.g., display 76); and audio output device (e.g., speaker) 78. Other types of input/output devices can also be connected to or comprise wireless terminal 30(6).

In the example of FIG. 6 the platform 60 has been illustrated as computer-implemented or computer-based platform. Another example platform 60 for wireless terminal can be that of a hardware circuit, e.g., an application specific integrated circuit (ASIC) wherein circuit elements are structured and operated to perform the various acts described herein.

Furthermore, it will be appreciated that, as used herein, "wireless terminal(s)" or "UE" can be mobile stations or user equipment units (UE) such as but not limited to mobile telephones ("cellular" telephones) and laptops with wireless capability), e.g., mobile termination), and thus can be, for example, portable, pocket, hand-held, computer-included, or car-mounted mobile devices which communicate voice and/or data with radio access network.

Figure 7:
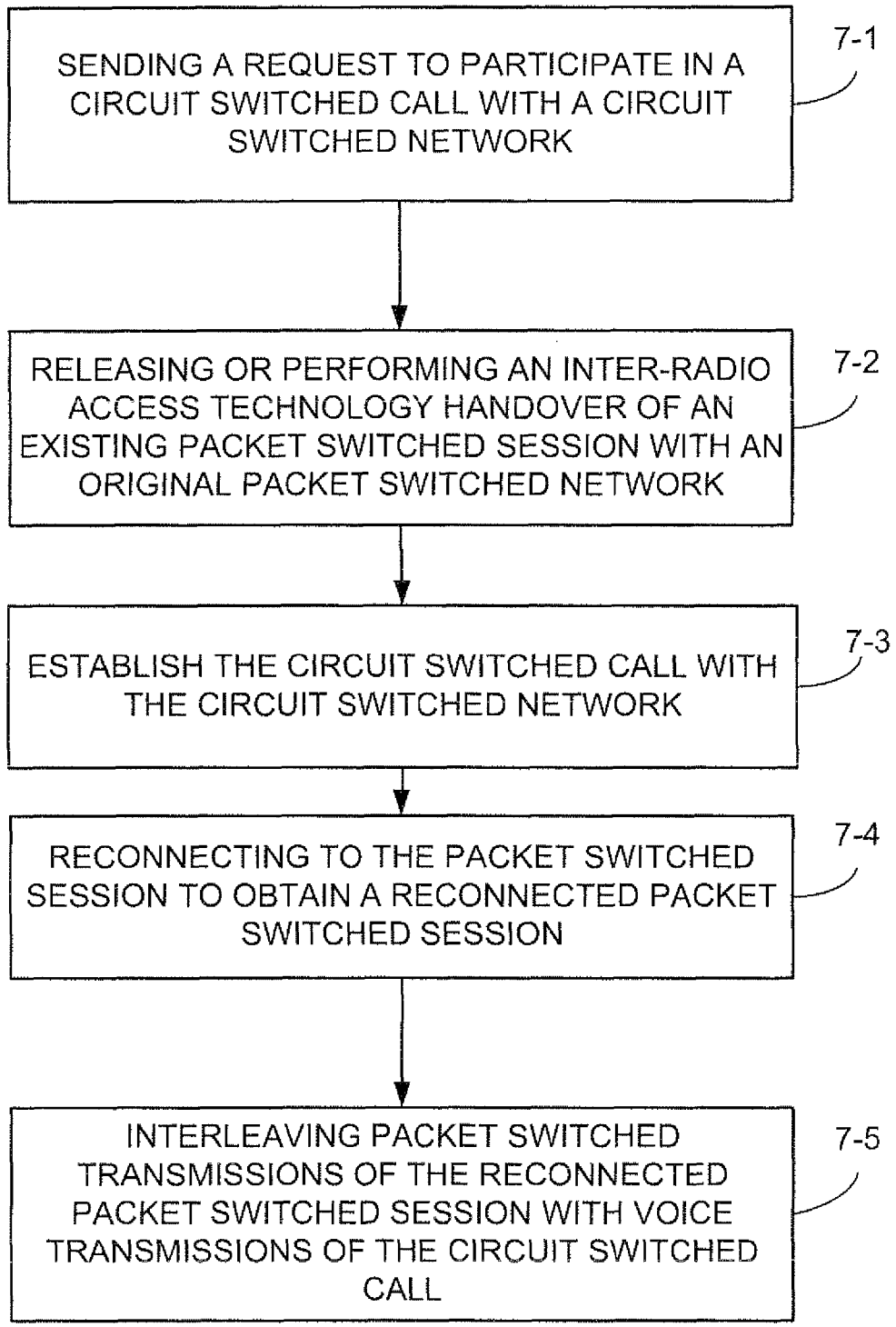
FIG. 7 is a flowchart showing representative, basic acts or steps included in a generic method of operating a wireless terminal according to an example mode.

FIG. 7 shows representative, basic acts or steps included in a generic method of operating a wireless terminal according to an example mode of the technology disclosed herein. Act 7-1 comprises the wireless terminal 30 (particularly circuit switched call controller 42) sending a request to participate in a circuit switched call with a circuit switched network. As depicted by act 7-2, prior to establishment of the circuit switched call the packet switched session controller 44 of wireless terminal 30 releases or performs an inter-radio access technology handover of an existing packet switched session with an original packet switched network (e.g., with the Long Term Evolution (LTE) network 22-1). Act 7-3 comprises establishing the circuit switched call with the circuit switched network. Act 7-4 comprises the packet switched reconnection logic 48 of wireless terminal 30 then reconnecting the wireless terminal 30 to the packet switched session to obtain a reconnected packet switched session. Thereafter, as act 7-5, the circuit switched call controller 42 and packet switched session controller 44 of wireless terminal 30 cooperate to interleave packet switched transmissions of the reconnected packet switched session with voice transmissions of the circuit switched call.

Figure 7A:
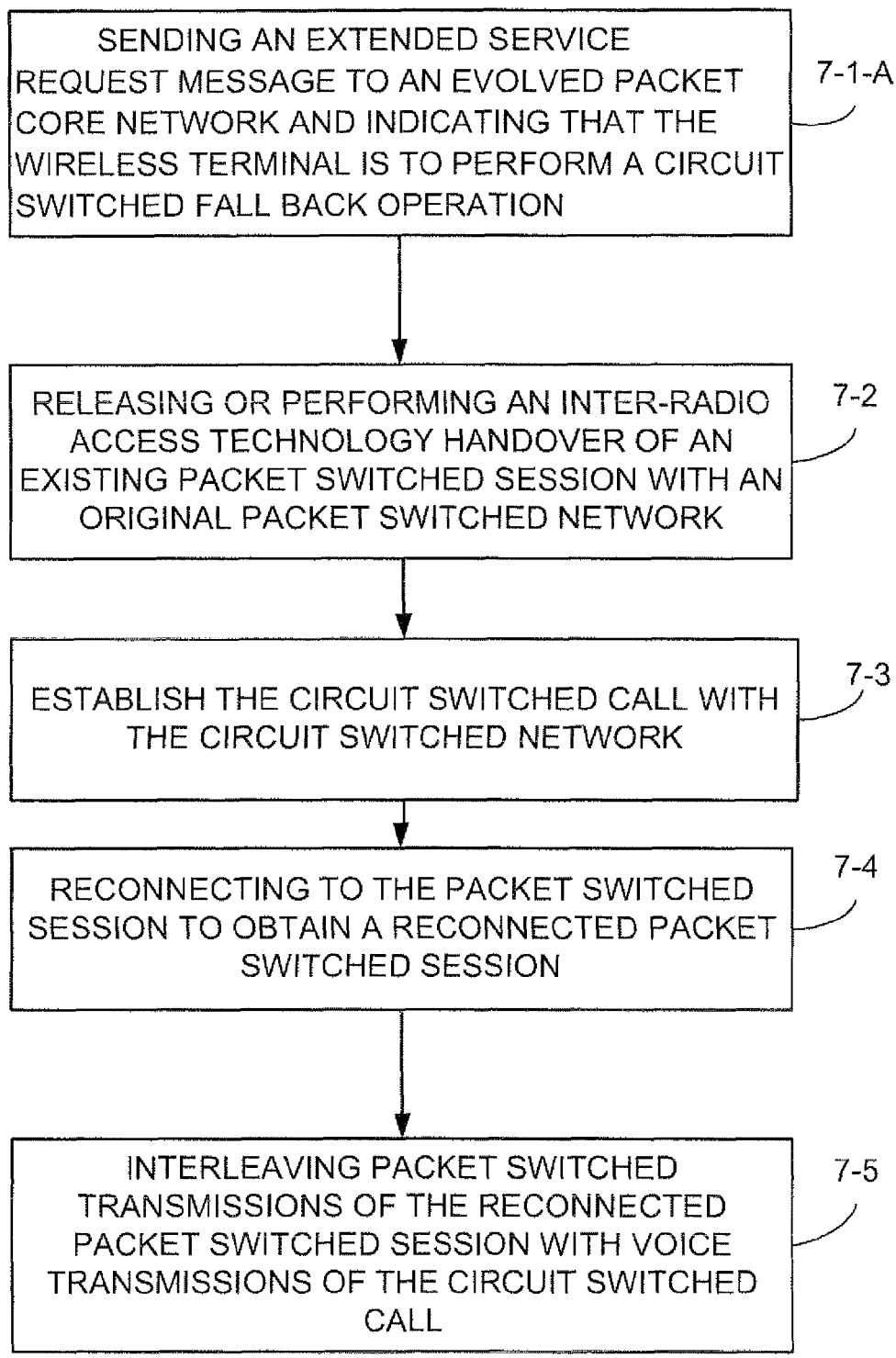
FIG. 7A, FIG. 7B, and FIG. 7C are flowcharts showing representative, basic acts or steps included in various example modes which are variations, enhancements, or more detailed examples of the generic mode of FIG. 7.

In an example embodiment and mode of the method illustrated by FIG. 7A, the act 7-1 of the wireless terminal sending a request to participate in a circuit switched call comprises (as act 7-1-A) the circuit switched call controller 42 of the wireless terminal 30 sending an extended service request message to an evolved packet core network and indicating that the wireless terminal is to perform a circuit switched fall back operation.

Figure 7B:
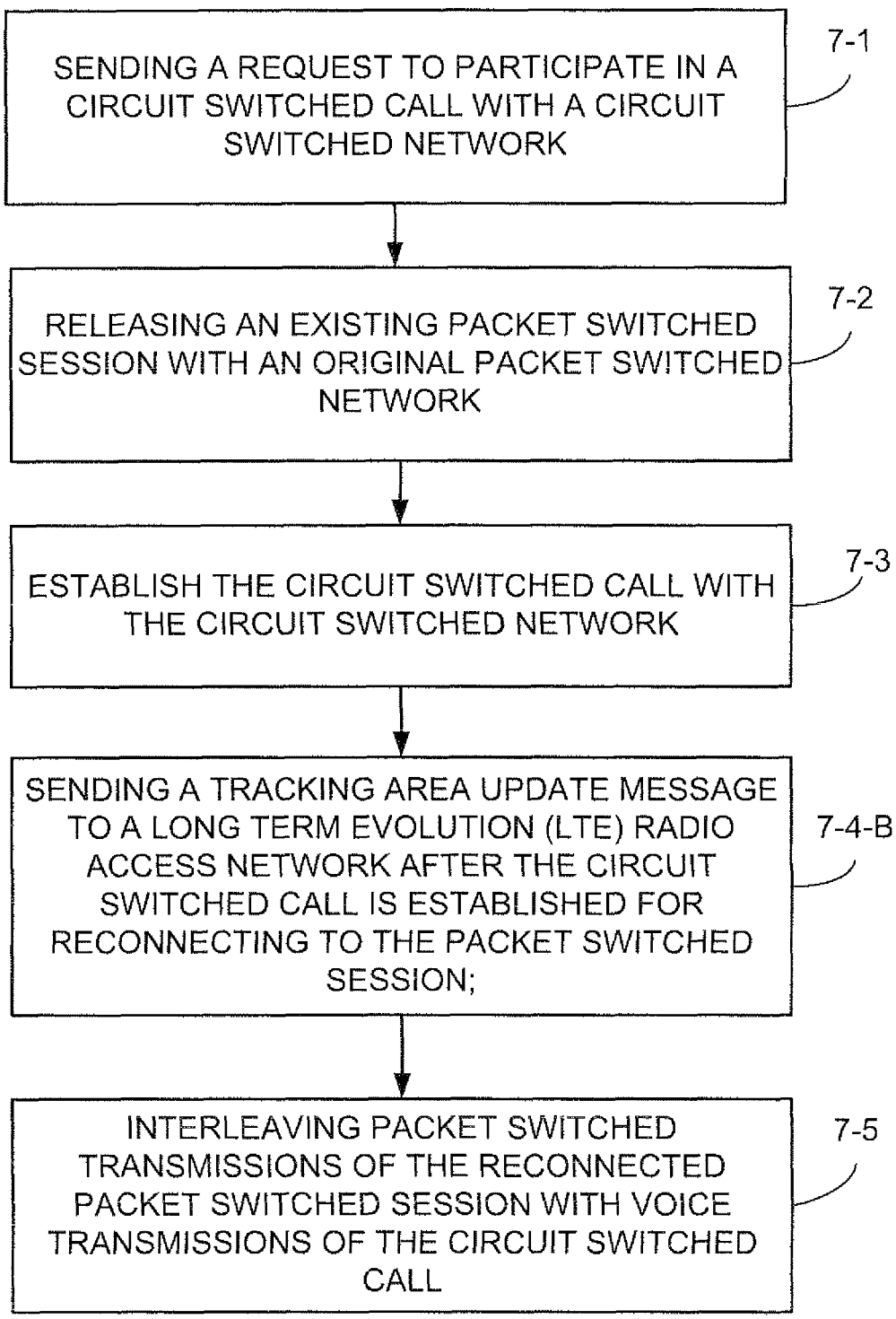

In an example embodiment and mode of the method illustrated by FIG. 7B, the act 7-4 of reconnecting to the packet switched session further comprises (as act 7-4-B) the packet switched session controller 44 of the wireless terminal sending a tracking area update message to a Long Term Evolution (LTE) radio access network after the circuit switched call is established. Notably the wireless terminal 30 foregoes performing a routing update procedure.

Figure 7C:
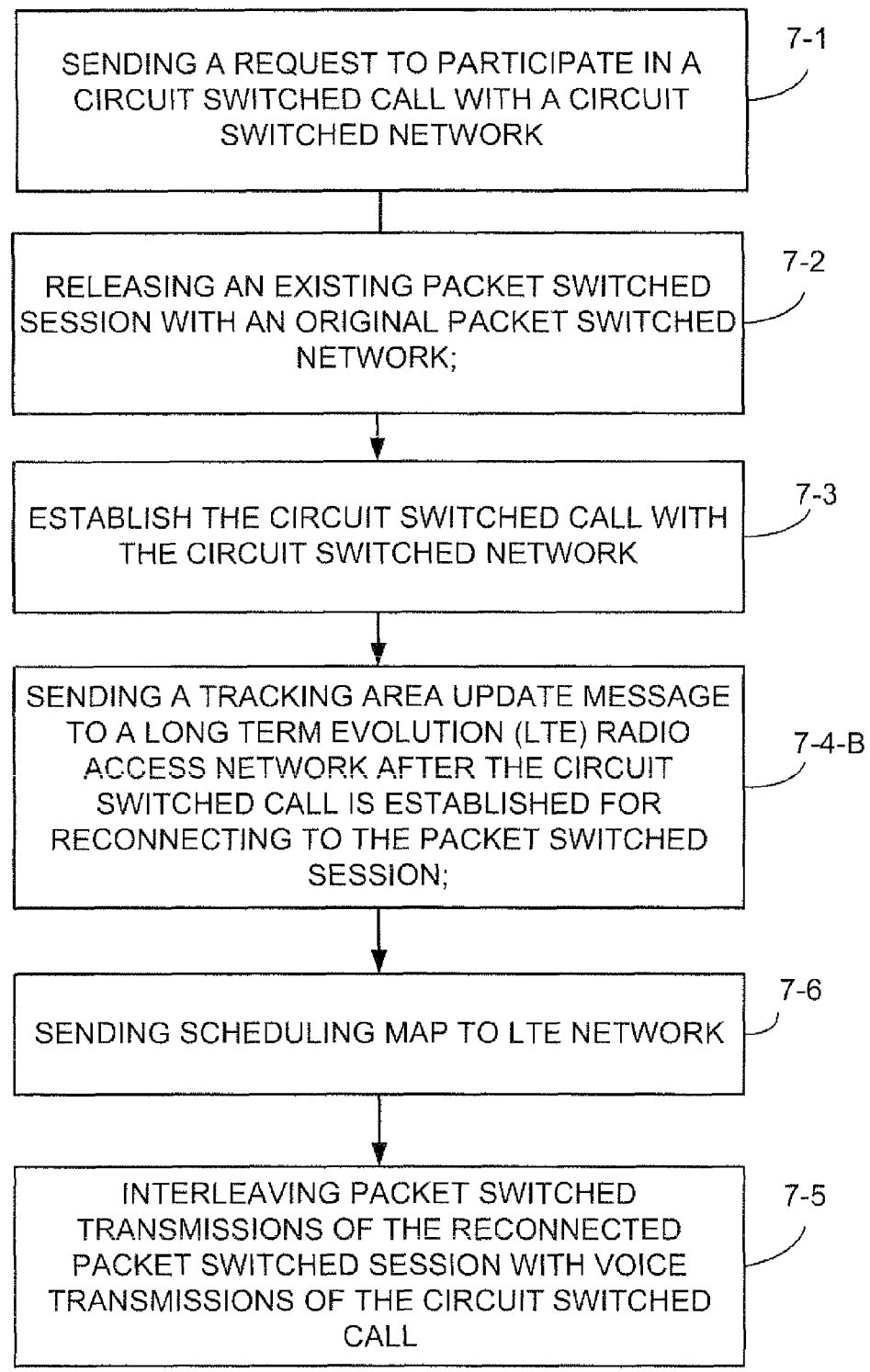

An example embodiment and mode of the method illustrated by FIG. 7C further comprises, as act 7-6 preceding act 7-5, the wireless terminal sending a scheduling map to the Long Term Evolution (LTE) radio access technology network to indicate time transmission intervals (TTIs) that can be used for packet switched transmissions (and thus the interleaving or multiplexing of act 7-5).

An example embodiment and mode further comprises configuring a feature group bit of the wireless terminal to prevent an inter-radio access technology packet switched handover.

In an example embodiment and mode the wireless performing the inter-radio access technology handover comprises handing over the existing packet switched session from the original packet switched network to a wideband code division multiple access network.

In an example embodiment and mode performing the inter-radio access technology handover comprises handing over the existing packet switched session from the original packet switched network to a GSM network to obtain a GSM dual transmission mode packet switched session; and further comprises the wireless terminal suspending the GSM dual transmission mode packet switched session and then sending a tracking area update message to a Long Term Evolution (LTE) radio access network for reconnecting to the packet switched session.

The technology disclosed herein including the foregoing methods encompass two different types of procedures or cases. A first procedure or case is when inter-radio access technology (IRAT) packet switched (PS) handover (HO) is supported; a second procedure or case is when inter-radio access technology (IRAT) packet switched (PS) handover (HO) is not supported (based on radio resource control [RRC] release and reconnect). The second procedure or case (i.e., when inter-radio access technology (IRAT) packet switched (PS) handover (HO) is not supported can also be divided into two subcases. The first subcase is when inter-radio access technology (IRAT) cell change order (CCO) (with or without Network Assisted Cell Change [NACC]) is supported. The second subcase is when inter-radio access technology (IRAT) cell change order (CCO) (with or with out NACC) is not supported.

The UE centric approach of reconnecting the LTE PS session via a tracking area update (TAU) after or in conjunction with the call set-up will have better performance in terms of a minimal packet switched (PS) outage if inter-radio access technology (IRAT) packet switched (PS) handover (HO) is not used and if not CCO with and without NACC is used. This is due to the fact that the PS session (PDP contexts) is then not moved from the LTE core to the 2G core.

The preference and ability for not using the IRAT PS handover (HO) can be controlled for the wireless terminal by using feature group indicators. In particular, one option to avoid using the IRAT PS handover (HO) is to set the feature group indicator (specified in 3GPP TS 36.331) for the wireless terminal with bit numbers 9 and 10 to zero. Such setting of bits prevents usage of IRAT PS HO and CCO with and without NACC from LTE to GSM when in an active PS session. Since this aspect is optional, FIG. 5 and FIG. 6 show (by broken line) feature group indicator memory 50 in which bits 9 and 10 are set equal to zero in order to preclude a inter-radio access technology (IRAT) packet switched (PS) handover (HO).

Figure 8:
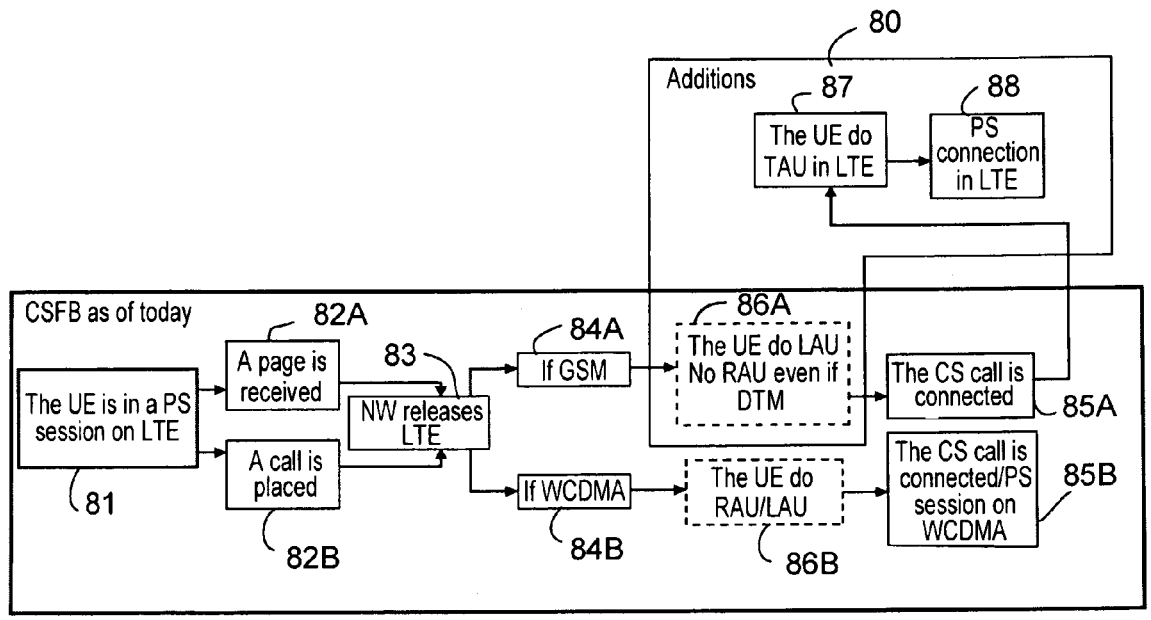
FIG. 8 is a diagrammatic view showing logic for the cases of originating and terminating a GSM call and the system is not using IRAT packet switched (PS) handover (HO).

FIG. 8 shows more detailed acts of a method, and thus the logic, for the cases of originating and terminating a GSM call and the system is not using inter-radio access technology (IRAT) packet switched (PS) handover (HO). In FIG. 8, additions and/or enhancements afforded by the technology disclosed herein compared to the 3GPP release 8 circuit switched fallback (CSFB) are shown as framed additions block 80.

In the first act (act 81), the wireless terminal is in a LTE PS session (the UE is in ECM-CONNECTED state). The wireless terminal can participate in a circuit switched (CS) call either by receiving a page (and thereby terminating the call) as indicated by act 82A, or by placing/originating the call as indicated by act 82B. If the wireless terminal terminates the circuit switched (CS) call (act 82B), a CS paging is received over LTE. In both cases (the wireless terminal originating and the wireless terminal terminating the call), the wireless terminal will send an Extended Service Request to the evolved packet core (EPC) with the information that the network shall perform circuit switched fallback (CSFB). The Extended Service Request is also known herein as a request to participate in the circuit switched (CS) call. The sending of the Extended Service Request triggers the eNodeB to perform a S1 UE Context Release request that indicates that the wireless terminal is no longer available for the packet switched (PS) service. Thus the LTE PS session is released (as reflected by act 83).

To establish the circuit switched (CS) call the wireless terminal can move to a Global System for Mobile communication (GSM) cell or a WCDMA cell, depending on which type of cell is appropriate and/or available. Act 84A of FIG. 8 depicts the wireless terminal moving to a new GSM cell, act 84B depicts the wireless terminal moving to a new WCDMA cell). For either move (to GSM or to WCDMA) the wireless terminal establishes the radio signaling connection. Act 85A of FIG. 8 depicts connection of the GSM circuit switched (CS) call; act 85B depicts the circuit switched (CS) call being connected (or a packet switched session established) in WCDMA. Even if the system (which comprises the network and wireless terminal) supports the dual transfer mode (DTM), the wireless terminal does not perform a routing area update (RAU). Deliberate omission of the routing area update (RAU) is reflected by broken line (not performed) act 86A for GSM and act 86B for WCDMA. Nor performing the routing area update (RAU) contrasts with the conventional approach, as according to the conventional method when DTM is supported the UE will perform a RAU to transfer the packet switched (PS) service from E-UTRAN to GSM.

The CS call is connected (act 85A, 85B) and in conjunction with connection of the circuit switched (CS) call the wireless terminal goes into GSM and the LTE Dual Transfer Mode (DTM), and also (as depicted by act 87) sends a tracking area update (TAU) in Long Term Evolution (LTE) to reestablish the LTE PS session. Re-establishment of the LTE PS session is depicted in FIG. 8 by act 88. In this process the wireless terminal also may send up a scheduling map to the Long Term Evolution (LTE) network to indicate which TTIs that can be used for LTE transport (see act 7-6 of FIG. 7C). Thereafter, using multiplexed or interleaved communications the wireless terminal participates in voice service with the GSM network and data services in the LTE Dual Transfer Mode (DTM).

Figure 9:
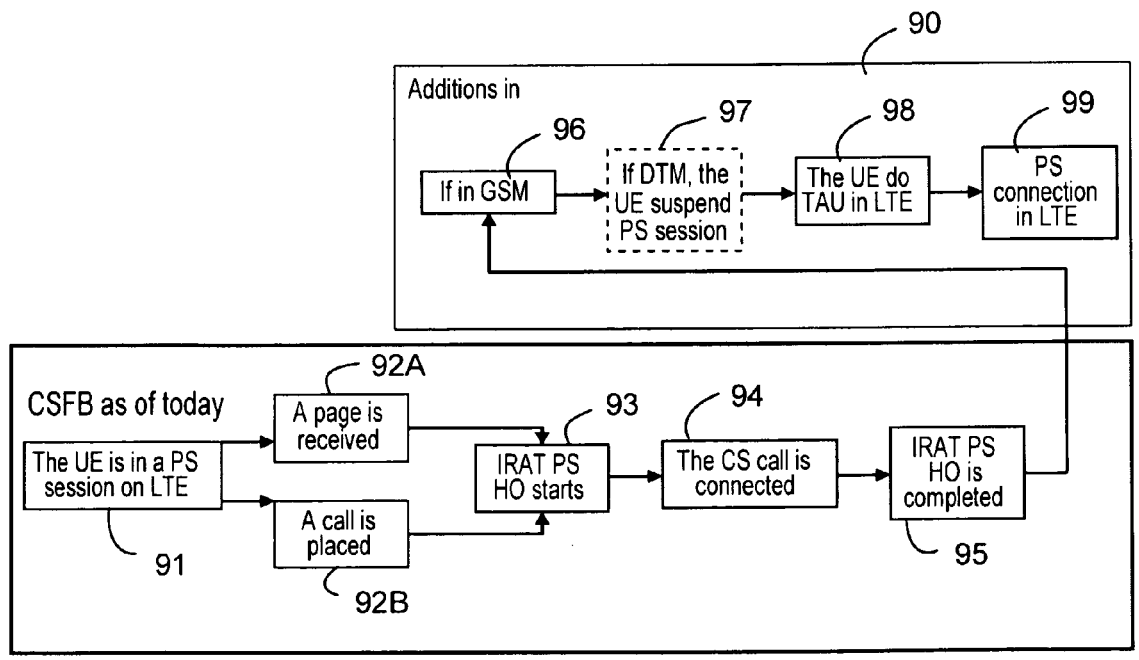
FIG. 9 is a diagrammatic view showing the logic when IRAT packet switched (PS) handover (HO) is supported.

FIG. 9 shows more detailed acts of a method, and thus the logic, for the cases of originating and terminating a GSM call when inter-radio access technology (IRAT) packet switched (PS) handover (HO) is supported. In FIG. 9, additions and/or enhancements afforded by the technology disclosed herein compared to the 3GPP release 8 circuit switched fallback (CSFB) are shown as framed additions block 90.

In the first step of act 91 the wireless terminal is in a LTE PS session (the UE is in ECM-CONNECTED state). For the scenario of FIG. 9 the network supports inter-radio access technology (IRAT) packet switched (PS) handover (HO), and the wireless terminal does not its feature group indicator bit 9 set to zero (although the recommendation is to set the feature group indicator bit 9 as explained above).

The wireless terminal can participate in a circuit switched (CS) call either by receiving a page (and thereby terminating the call) as indicated by act 92A, or by placing/originating the call as indicated by act 92B. If the wireless terminal terminates the circuit switched (CS) call (act 92B), a CS paging is received over LTE.

In the case of FIG. 9 wherein the wireless terminal and the network support inter-radio access technology (IRAT) packet switched (PS) handover (HO), placing/originating the circuit switched call triggers the network to begin to perform an inter-radio access technology (IRAT) packet switched (PS) handover (HO) of the LTE session to the GSM network, as depicted by act 93. Act 94 shows the wireless terminal moving to the new GSM cell (or WCDMA cell) and establishing the radio signaling connection. The CS call is connected. The IRAT PS HO execution phase continues and is completed as depicted by act 95.

If the wireless terminal is in GSM, acts 96-99 are performed and the rest of the procedures mentioned below apply. On the other hand, if the inter-radio access technology (IRAT) packet switched (PS) handover (HO) moved the wireless terminal to WCDMA CSFB, then the circuit switched fallback (CSFB) procedures as specified in Release 8 apply.

Act 96 shows that the circuit switched (CS) is in GSM. If the wireless terminal goes into the Dual Transfer Mode (DTM) mode and continues the PS session, the wireless terminal suspends the GSM DTM PS session (as depicted by act 97) to be able to interleave LTE transmissions in between the GSM transmission gaps. In this process the wireless terminal also may send up a scheduling map to LTE to indicate which TTIs that can be used for LTE transport (see act 7-6 of FIG. 7C). The wireless terminal goes into multiplexing or interleaving between the GSM and LTE TDM mode, and (as act 98) sends a tracking area update (TAU) in LTE to reestablish the LTE PS session (depicted by act 99).

There are numerous advantages of the technology disclosed herein, examples of which are now briefly mentioned. For example, Long Term Evolution (LTE) access during a GSM call provides the possibility of CS and PS services in parallel. This wireless terminal centric approach of reconnecting to the LTE PS session in conjunction with or after the GSM call is established to allow for LTE and GSM access multiplexing has no impact on the CSFB signaling flows as specified in 3GPP release 8.

The technology disclosed herein also enhances the Release 8 circuit switched fallback (CSFB) by allowing the wireless terminal to reconnect to Long Term Evolution (LTE) access during the GSM call and interleaving LTE data transmissions in between GSM CS voice transmissions.

Advantageously the functionality described herein is added to a wireless terminal that is executed in conjunction with circuit switched fallback (CSFB). After the call is connected, the wireless terminal goes into the mode of doing LTE data transmissions interleaved in between GSM CS voice transmissions and in conjunction with that perform a Tracking Area Update (TAU) to EPC to re-establish the PS session in LTE.

Another advantage described herein is the functionality that a wireless terminal only re-establishes the PS session in LTE if the access to be used for the voice call is GSM and there is LTE coverage, regardless whether or not the GSM network and/or wireless terminal support Dual Transfer Mode (DTM) or not.

Another example advantage is the functionality that a wireless terminal having the capability of interleaving LTE transmissions in between GSM transmissions may have it feature group indicators 9 and 10 set to zero for optimizing the packet switched (PS) outage times.

Another example advantage is the functionality that a UE capable of interleaving LTE transmissions in between GSM transmissions performing a CSFB in a system that does not support IRAT PS HO but do support DTM, do not perform any RAU to faster allow for the UE to get LTE access after the CSFB have been performed.

Another example advantage is the functionality that a wireless terminal (capable of interleaving LTE transmissions in between GSM transmissions performing a CSFB in a system that support IRAT PS HO and does support DTM) may suspend the PS session in order to be able to do a tracking area update (TAU) and use the transmission gaps between GSM CS voice transmissions for LTE data transport.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of operating a wireless terminal comprising:
   the wireless terminal sending a request to participate in a circuit switched call with a circuit switched network;
   prior to establishment of the circuit switched call the wireless terminal releasing or performing an inter-radio access technology handover of an existing packet switched session with an original packet switched network;
   establishing the circuit switched call with the circuit switched network;
   the wireless terminal reconnecting to the packet switched session to obtain a reconnected packet switched session; and
   the wireless terminal interleaving packet switched transmissions of the reconnected packet switched session with voice transmissions of the circuit switched call;
   wherein reconnecting to the packet switched session further comprises the wireless terminal sending an update message to a radio access network after the circuit switched call is established for reconnecting to the packet switched session, wherein the update message indicates to the radio access network that the wireless terminal is reconnected to the packet switched session.

2. The method of claim 1, wherein the act of the wireless terminal sending a request to participate in a circuit switched call comprises the wireless terminal sending an extended service request message to an evolved packet core network and indicating that the wireless terminal is to perform a circuit switched fall back operation.

3. The method of claim 1, wherein sending the update message to the radio access network comprises sending a tracking area update message to a Long Term Evolution (LTE) radio access network.

4. The method of claim 3, wherein before the circuit switched call is established the wireless terminal foregoes performing a routing update procedure.

5. The method of claim 3, further comprising the wireless terminal sending a scheduling map to the Long Term Evolution (LTE) radio access technology network to indicate time transmission intervals (TTIs) that can be used for packet switched transmissions.

6. The method of claim 1, further comprising configuring a feature group bit of the wireless terminal to prevent an inter-radio access technology packet switched handover.

7. The method of claim 1, wherein performing the inter-radio access technology handover comprises handing over the existing packet switched session from the original packet switched network to a wideband code divisional multiple access network.

8. The method of claim 1, wherein performing the inter-radio access technology handover comprises handing over the existing packet switched session from the original packet switched network to a GSM network to obtain a GSM dual transmission mode packet switched session; and wherein the method further comprises the wireless terminal suspending the GSM dual transmission mode packet switched session and sending the update message to the radio access network comprises sending a tracking area update message to a Long Term Evolution (LTE) radio access network for reconnecting to the packet switched session.

9. A wireless terminal capable of communicating over a radio interface, the wireless terminal being configured to:
   send a request to participate in a circuit switched call with a circuit switched network;

release or perform an inter-radio access technology handover of an existing packet switched session with an original packet switched network prior to establishment of a circuit switched call;
establish the circuit switched call with the circuit switched network;
reconnect to the packet switched session to obtain a reconnected packet switched session; and
interleave packet switched transmissions of the reconnected packet switched session with voice transmissions of the circuit switched call;
wherein being configured to reconnect to the packet switched session further comprises being configured to send an update message to a radio access network after the circuit switched call is established for reconnecting to the packet switched session, wherein the update message indicates to the radio access network that the wireless terminal is reconnected to the packet switched session.

10. The wireless terminal of claim 9, further comprising:
a circuit switched call controller configured to generate a request to participate in a circuit switched call with a circuit switched network and thereafter control the transmissions of the circuit switched call;
a packet switched session controller configured, prior to establishment of the circuit switched call, to release or perform an inter-radio access technology handover of an existing packet switched session with the original packet switched network and thereafter to reconnect to the packet switched session to obtain the reconnected packet switched session and to control transmissions of the packet switched session; and
a communications interface configured to perform transmissions of the circuit switched call and transmissions of the packet switched session.

11. The wireless terminal of claim 10, wherein the circuit switched controller is configured to send an extended service request message to an evolved packet core network and to indicate that the wireless terminal is to perform a circuit switched fall back operation.

12. The wireless terminal of claim 10, wherein the packet switched session controller is configured to send the update message to the radio access network by being configured to send a tracking area update message to a Long Term Evolution (LTE) radio access network after the circuit switched call is established for reconnecting to the packet switched session.

13. The wireless terminal of claim 12, wherein the circuit switched call controller is configured to forego performing a routing update procedure before the circuit switched call is established.

14. The wireless terminal of claim 12, wherein the packet switched session controller is configured to send a scheduling map to the Long Term Evolution (LTE) radio access technology network to indicate time transmission intervals (TTIs) that can be used for packet switched transmissions.

15. The wireless terminal of claim 10, further comprising a feature group memory comprising a feature group bit which is configured to prevent an inter-radio access technology packet switched handover.

16. The wireless terminal of claim 10, wherein the packet switched session controller is configured to perform a hand over of the existing packet switched session from the original packet switched network to a wideband code divisional multiple access network.

17. The wireless terminal of claim 10, wherein the packet switched session controller is configured to performing a handover of the existing packet switched session from the original packet switched network to a GSM network to obtain a GSM dual transmission mode packet switched session; and is further configured to suspend the GSM dual transmission mode packet switched session and then send the update message to the radio access network by being configured to send a tracking area update message to a Long Term Evolution (LTE) radio access network for reconnecting to the packet switched session.

18. The wireless terminal of claim 10, further comprising electronic circuitry configured to implement the circuit switched call controller and the packet switched session controller.

19. A method of operating a communications system comprising:
establishing a packet switched session between a wireless terminal and an original packet switched network;
the wireless terminal sending a request to participate in a circuit switched call with a circuit switched network;
prior to establishment of the circuit switched call the wireless terminal releasing or performing an inter-radio access technology handover of an existing packet switched session with an original packet switched network;
establishing the circuit switched call between the wireless terminal and a circuit switched network;
the wireless terminal reconnecting to the packet switched session to obtain a reconnected packet switched session; and
the wireless terminal interleaving packet switched transmissions of the reconnected packet switched session with voice transmissions of the circuit switched call;
wherein reconnecting to the packet switched session further comprises the wireless terminal sending an update message to a radio access network after the circuit switched call is established for reconnecting to the packet switched session, wherein the update message indicates to the radio access network that the wireless terminal is reconnected to the packet switched session.

20. The method of claim 1, further comprising:
establishing the circuit switched call with the circuit switched network; and then
the wireless terminal reconnecting to the packet switched session to obtain the reconnected packet switched session; and
the wireless terminal interleaving the packet switched transmissions of the reconnected packet switched session with the voice transmissions of the circuit switched call.

21. The wireless terminal of claim 9, wherein the wireless terminal is configured to:
establish the circuit switched call with the circuit switched network; and then
reconnect to the packet switched session to obtain the reconnected packet switched session; and
interleave the packet switched transmissions of the reconnected packet switched session with the voice transmissions of the circuit switched call.

22. The method of claim 19, further comprising:
establishing the circuit switched call with the circuit switched network; and then
the wireless terminal reconnecting to the packet switched session to obtain the reconnected packet switched session; and
the wireless terminal interleaving the packet switched transmissions of the reconnected packet switched session with the voice transmissions of the circuit switched call.

* * * * *